(12) United States Patent
Steinhorst et al.

(10) Patent No.: US 8,233,800 B2
(45) Date of Patent: Jul. 31, 2012

(54) METHOD AND SYSTEM FOR UPGRADING A FIBER OPTICS NETWORK

(75) Inventors: Larry Henry Steinhorst, Plano, TX (US); Wilson kit-man Chan, Richardson, TX (US); Junji Yamamoto, Machida (JP)

(73) Assignee: Fujitsu Limited, Kawasaki (JP)

( * ) Notice: Subject to any disclaimer, the term of this patent is extended or adjusted under 35 U.S.C. 154(b) by 2921 days.

(21) Appl. No.: 10/609,332

(22) Filed: Jun. 26, 2003

(65) Prior Publication Data

US 2004/0264962 A1    Dec. 30, 2004

(51) Int. Cl.
*H04J 14/08* (2006.01)
*H04B 10/20* (2006.01)
(52) U.S. Cl. .............................. 398/98; 398/59
(58) Field of Classification Search ............... 398/58, 398/59, 99, 98, 100, 101, 102, 103; 370/254; 455/452.1
See application file for complete search history.

(56) References Cited

U.S. PATENT DOCUMENTS

| | | | |
|---|---|---|---|
| 5,629,940 A * | 5/1997 | Gaskill ........................... | 370/311 |
| 6,130,764 A * | 10/2000 | Taniguchi ......................... | 398/1 |
| 6,219,336 B1 | 4/2001 | Takahashi et al. ............ | 370/223 |
| 6,534,997 B1 * | 3/2003 | Horishita et al. .............. | 324/534 |
| 6,625,165 B1 * | 9/2003 | Krishnamoorthy et al. .. | 370/465 |
| 6,694,100 B1 * | 2/2004 | Fatehi et al. ...................... | 398/99 |
| 6,888,853 B1 * | 5/2005 | Jurgensen ........................... | 372/6 |
| 7,016,378 B1 * | 3/2006 | Dasika et al. .................. | 370/535 |
| 2001/0033570 A1 | 10/2001 | Makam et al. ................. | 370/373 |
| 2001/0038733 A1 | 11/2001 | Cicchese et al. ................. | 385/24 |
| 2002/0080438 A1 | 6/2002 | Beine et al. .................... | 359/110 |
| 2002/0167693 A1 | 11/2002 | Vrazel et al. ................... | 359/109 |
| 2002/0186439 A1 | 12/2002 | Buabbud et al. .............. | 359/173 |
| 2004/0179518 A1 * | 9/2004 | Bruckman et al. ............ | 370/358 |
| 2004/0213223 A1 * | 10/2004 | Mori et al. ..................... | 370/389 |
| 2004/0213236 A1 * | 10/2004 | Hattori .......................... | 370/392 |
| 2004/0223451 A1 * | 11/2004 | Homma et al. ................ | 370/228 |
| 2005/0181831 A1 * | 8/2005 | Doi ............................. | 455/562.1 |

* cited by examiner

*Primary Examiner* — Nathan Curs
(74) *Attorney, Agent, or Firm* — Baker Botts L.L.P.

(57) ABSTRACT

According to one embodiment of the invention, a method for providing communications service in a communications ring undergoing an upgrade process includes increasing an existing rate of a node to a higher rate. With the increase, the node is operable to transmit a second frame at the higher rate. The second frame has a higher number of time slots than a first frame having a number of slots equal to N. The method also includes occupying a number of the time slots of the second frame equal to N using data to be received by an existing node. The method also includes providing at least one identifier to the existing node that will receive the second frame. The identifier identifies the occupied time slots of the second frame. The method also includes transmitting the second frame of data to the existing node.

33 Claims, 2 Drawing Sheets

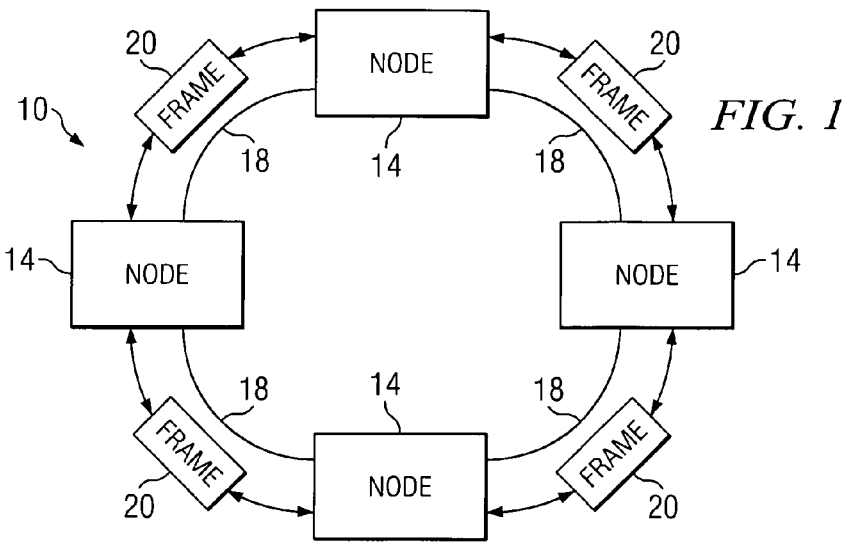
*FIG. 1*
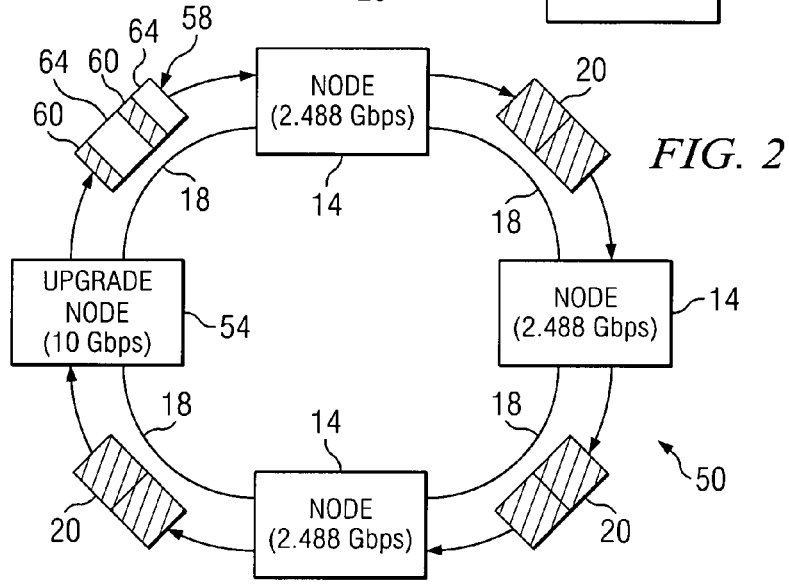
*FIG. 2*
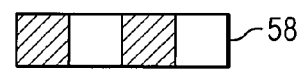
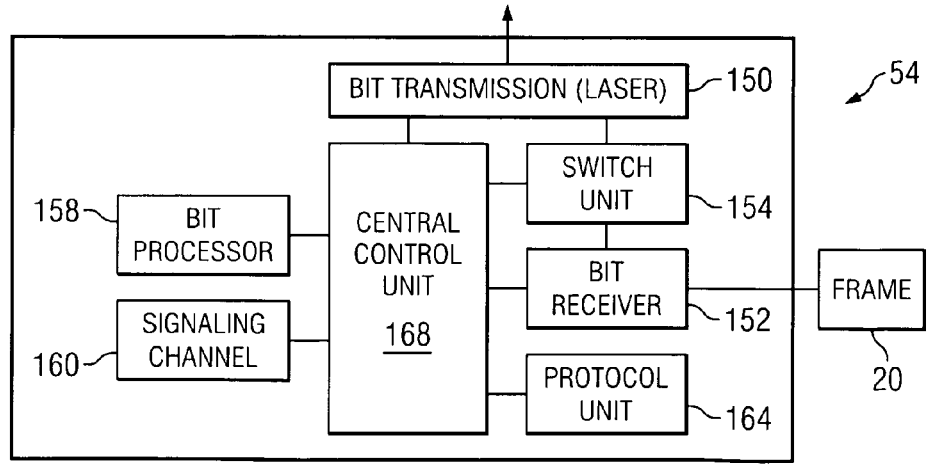
*FIG. 4*

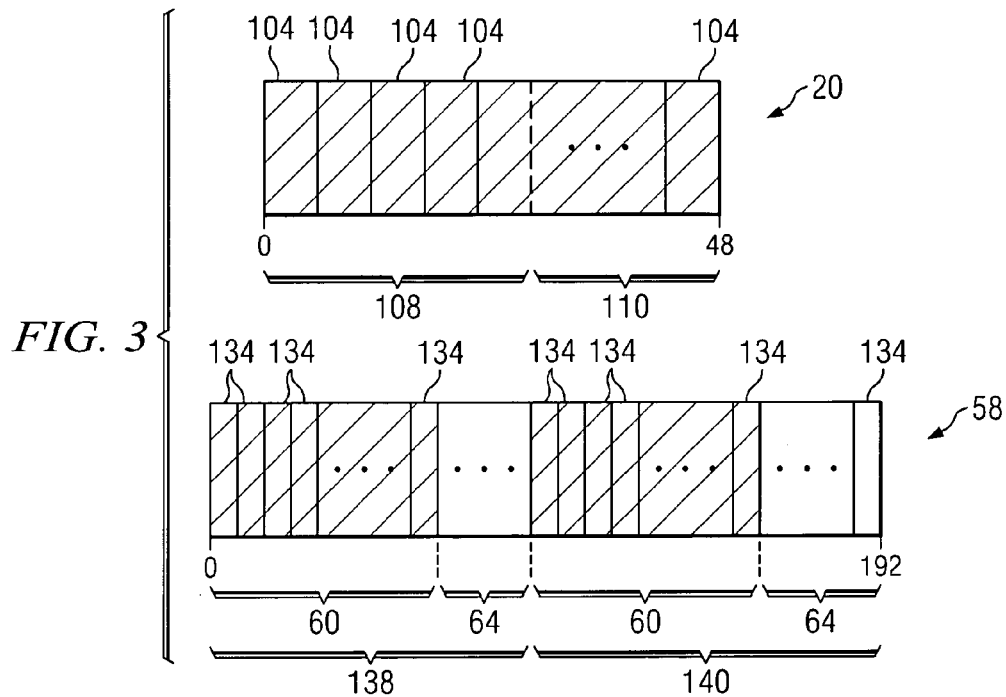
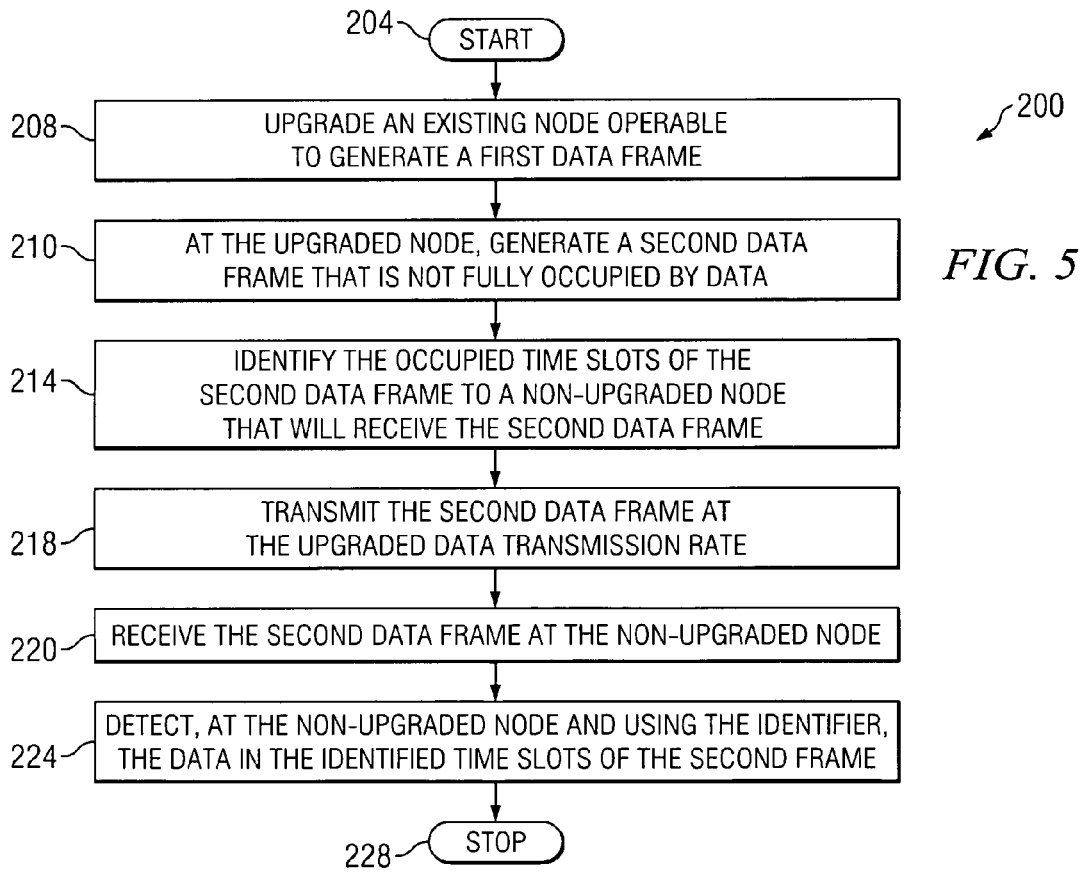

METHOD AND SYSTEM FOR UPGRADING A FIBER OPTICS NETWORK

TECHNICAL FIELD OF THE INVENTION

This invention relates generally to communications and more particularly to a method and system for upgrading a fiber optics network.

BACKGROUND OF THE INVENTION

A fiber optics network is often used for communication of data. In a fiber optics network, data is transmitted from one node to another node as light pulses along a glass and/or plastic fiber. To lower the probability of communications failure in a fiber optics network, certain protection mechanisms may be built into the network to provide communications redundancy. One example of a protection mechanism is bi-directional line switched ring ("BLSR"), which is a configuration where a closed loop or a "ring" is formed by a plurality of nodes connected to each other through optical fiber. By using the closed-loop configuration, the BLSR architecture provides an alternate route for a data frame to reach its destination in case of a line failure. For example, if there is a break in a span of optical fiber leading to a destination in one direction of the ring, data may be sent in the opposite direction of the ring to reach the same destination.

The protocol associated with BLSR may require the nodes in the ring to operate at a same data transmission rate for proper operation of the network. This requirement increases communications service down time during a network upgrade because all nodes may be required to be upgraded to operate at an upgraded transmission rate before service may resume. For example, while an OC-48 fiber optics network is being upgraded to an OC-192 network, the network may be unable to provide service until all of the nodes in the network are upgraded to operate at a data transmission rate that is associated with OC-192.

SUMMARY OF THE INVENTION

According to one embodiment of the invention, a method for providing communications service in a communications ring undergoing an upgrade process is provided. The communications ring is formed from a plurality of existing nodes each operable to transmit, at an existing rate, a first frame having a number of occupied time slots equal to N occupied by data. N is an integer. The method includes increasing the existing rate of a node to a higher rate. With the increase, the node is operable to transmit a second frame at the higher rate. The second frame has a higher number of time slots than the first frame. The method also includes occupying a number of the time slots of the second frame equal to N using data to be received by an existing node. The method also includes providing at least one identifier to the existing node that will receive the second frame. The identifier identifies the occupied time slots of the second frame. The method also includes transmitting the second frame of data to the existing node.

Some embodiments of the invention provide numerous technical advantages. Other embodiments may realize some, none, or all of these advantages. For example, according to one embodiment, communications service may be provided during an upgrade of a fiber optics network. In another embodiment, nodes having different data transmission rates may be used in a fiber optics network that is using a BLSR protection mechanism.

Other advantages may be readily ascertainable by those skilled in the art.

BRIEF DESCRIPTION OF THE DRAWINGS

Reference is now made to the following description taken in conjunction with the accompanying drawings, wherein like reference numbers represent like parts, in which:

FIG. 1 is a schematic diagram illustrating one embodiment of a fiber optics network that may benefit from the teachings of the present invention;

FIG. 2 is a schematic diagram illustrating one embodiment of the fiber optics network of FIG. 1 that is undergoing an upgrade process;

FIG. 3 is a schematic diagram illustrating additional details of data frames that may be transmitted by the nodes in the network of FIG. 2;

FIG. 4 is a schematic diagram illustrating one embodiment of a node shown in FIG. 2; and FIG. 5 is a flowchart illustrating one embodiment of a method for providing communication service upgrading a fiber optics network.

DETAILED DESCRIPTION OF EXAMPLE EMBODIMENTS OF THE INVENTION

Embodiments of the invention are best understood by referring to FIGS. 1 through 5 of the drawings, like numerals being used for like and corresponding parts of the various drawings.

FIG. 1 is a schematic diagram illustrating one embodiment of a fiber optics network 10 that may benefit from the teachings of the present invention. Network 10 comprises a plurality of nodes 14 that are coupled to each other through optical fiber 18. Examples of node 14 include an optical switch and a repeater; however, any device that has a programmed or engineered capability to process and/or forward data to a destination may be a node. As shown in FIG. 1, nodes 14 form a closed loop in conjunction with fiber 18. This configuration is referred to as a bi-directional line switched ring ("BLSR"), which is a protection mechanism designed to protect network 10 from communications failure. For example, where a span of fiber 18 between two nodes 14 are disconnected, the two nodes 14 may communicate with each other in the opposite direction. Each node 14 is operable to transmit and receive data frames 20. Each frame 20 has a plurality of time slots that are occupied by data. Using frames 20, nodes 14 may communicate data over fiber 18. The number of time slots in frame 20 may depend on optical carrier ("OC") level of network 10. For example, where network 10 is an OC-48 network, frame 20 has forty-eight time slots. For illustrative purposes, network 10 is described as an OC-48 network; however, network 10 may have any optical carrier level.

The communications protocol that is used in conjunction with the BLSR configuration of network 10 requires each node 14 to operate at a same data transmission rate. For example, because network 10 is described here as an OC-48 network, all nodes 14 may be required to operate at a rate that is associated with OC-48 network, which is 2.5 gigabits per second ("Gbps"). Thus, each node 14 is operable to send and receive frame 20, which has forty-eight time slots at 2.5 Gbps.

Because of this requirement concerning data transmission rate, an upgrade of network 10 conventionally requires network 10 to cease communications service until all nodes 14 are modified to operate at a transmission rate that is associated with the optical carrier level to which network 10 is upgraded. For example, where network 10 is upgraded from OC-48 to OC-192, all nodes 14 may need to be upgraded from operating at 2.5 Gbps to 10 Gbps before resuming communications service. Because nodes 14 are generally upgraded a few at a time until all nodes 14 are upgraded, the upgrade process may result in significant down time of network 10.

According to one embodiment of the present invention, a method and system for providing communications service while upgrading a fiber optics network are provided. In one embodiment, the amount of down time for a network undergoing an upgrade process is reduced. In another embodiment, nodes having different data transmission rates may be used in a fiber optics network using BLSR protection mechanism. Additional details of example embodiments of the invention are described below in greater detail in conjunction with FIGS. 2 through 5.

FIG. 2 is a schematic diagram illustrating one embodiment of a fiber optics network 50 that is undergoing an upgrade process. For illustrative purposes, network 50 is characterized as an OC-48 network that is being upgraded to OC-192 network; however, any process where optical carrier level is being changed may benefit from the teachings of the present invention. As shown in FIG. 2, one node 14 that operates at 2.5 Gbps is replaced with or converted to an upgraded node 54 as a part of the upgrade process to OC-192; however, more than one node 14 may be upgraded at a time.

Because network 50 is being upgraded to OC-192, node 54 is operable to send data at a rate of 10 Gbps. Although upgraded node 54 has a data transmission rate that is different from non-upgraded nodes 14 (also referred to as "existing nodes 14"), upgraded node 54 allows network 50 to provide communications service by transmitting a frame 58 at 10 Gbps that is perceived by a non-upgraded node 14 as lower rate frame 20, which is a frame used in an OC-48 network. This perception by non-upgraded node 14 is created by configuring node 54 so that frame 58, which is transmitted at 10 Gbps to node 14, has a number of occupied time slots 60 equal to the number of occupied time slots in lower rate frame 20. For example, node 54 is operable to configure frame 58 so that data occupies only forty eight time slots 60 out of one hundred and ninety two available time slots, which results in one hundred and forty four unoccupied time slots 64. Although node 54 is described using specific numbers of time slots associated with OC-48 and OC-192, the number of occupied time slots 60, the number of unoccupied time slots 64, and the total number of time slots in frame 58 may vary depending on the involved OC levels, as well known by one skilled in the art.

To allow node 14 that is receiving frame 58 to detect data in frame 58, the node 14 is configured to receive data at the transmission rate of node 54, which is 10 Gbps in this example. Further, the node 14 is provided with an identifier that identifies the occupied time slots 60 of frame 58. For example, the time slots of frame 58 may be labeled with numbers ranging from "0" to "191." Thus, if time slots "0" through "23" and "100" through "123" are occupied by data, then "0 through 23" and "100 through 123" are provided to node 14 as identifiers identifying occupied time slots 60. Using the identifiers, the node 14 may be directed to examine only the identified time slots 60 for data, which allows the node 14 to perceive frame 58 as frame having only forty eight time slots. Although data is shown as occupying two separate groups of time slots in frame 58, data may occupy any time slot as long as the number time slots occupied remains the same as that in an OC-48 frame.

To allow upgraded node 54 to receive lower rate frame 20 from non-upgraded node 14, node 54 is configured to receive data at the transmission rate of the non-upgraded node 14, which is 2.5 Gbps in this example. Further, upgraded node 54 is configured so that its signaling channel carries a protocol that is aligned with the transmission rate of the node 14. Thus, where network 50 is being upgraded from OC-48 to OC-192, the signaling channel of node 54 operates using the 2.5 Gbps protocol, which allows node 54 to receive lower rate frame 20 transmitted at 2.5 Gbps.

By providing node 54 for each node 14 and identifying occupied time slots 60 of frame 58 for the non-upgraded nodes 14 receiving frame 58, network 50 may be upgraded without significant down time in communications service. Once all nodes 14 of network 50 are upgraded to nodes 54 by conversion and/or replacement in this manner, the signaling channel of each node 54 may be directed to operate using a protocol aligned with the transmission rate that is associated with the optical carrier level to which network 50 is upgraded, which, in this example, is 10 Gbps.

FIG. 3 is a schematic diagram illustrating additional details of frames 58 and 20. Lower rate frame 20 comprises a number of individual time slots 104 equal to N. N is an integer, and in one embodiment where node 14 is OC-48 network, N equals forty-eight. In one embodiment, all of time slots 104 of lower rate frame 20 are occupied with data; however, this may not be the case in some frames 20. In one embodiment, time slots 104 may be categorized into different groups. For example, in one embodiment, a group 108 of time slots 104 may be designated for payload data and a group 110 of time slots 104 may be designated for redundancy data.

Frame 58 comprises a number of individual time slots 134 equal to M. M is an integer, and in one embodiment where network 50 is being upgraded to OC-192, M equals one hundred and ninety two. To make frame 58 appear to be lower rate frame 20 to receiving node 14, only a number of time slots 134 equal to N is occupied by data, which leaves unoccupied group 64 of time slots 134. In one embodiment, time slots 134 are divided into different categories for different portions of data. For example, a group 138 of time slots 134 may be designated for payload data. A group 140 of time slots 134 may be designated for redundancy data.

In one embodiment where node 54 is retransmitting data received in lower rate frame 20, payload data that occupied group 108 of time slots 104 only occupies time slots 134 in group 138. The number of time slots 104 or 134 occupied by payload data remains the same between frames 20 and 58. For example, if payload data occupied twenty four time slots 104 in group 108 of lower rate frame 20, then payload data occupies twenty four time slot 134 in group 138 of frame 58. Analogously, redundancy data may occupy the same number of time slots 134 in group 140 as it did in group 110 of lower rate frame 20. For example, if redundancy data occupied twenty four time slots 104 in group 110 of lower rate frame 20, then the redundancy data also occupies twenty four time slots 134 in group 140 of frame 58. However, in some embodiments, data occupying a number of time slots 104 in lower rate frame 20 occupies the same number of time slots 134 in frame 58 regardless of the grouping or the type of data.

FIG. 4 is a schematic diagram illustrating one embodiment of a node, such as node 54 or node 14, shown in FIG. 2. Node 54 comprises a bit transmission unit 150, a bit receiver 152, a switch unit 154, a bit processor 158, a signaling channel 160, and a protocol unit 164 that are coupled to each other through a central control unit 168. As shown in FIG. 4, bit transmission unit 150 is coupled to bit receiver 152, and bit receiver 152 is coupled to switch unit 154. An example of bit transmission unit 150 includes a laser unit that is operable to transmit light signals over fiber 18 according to the instructions from switch unit 154. In one embodiment, upgrading node 14 to node 54 involves providing bit transmission unit 150 that is operable to transmit light signals at a faster rate. Thus, because node 54 is a part of an OC-192 network, bit transmission unit 150 is operable to transmit light signals at 10 Gbps. Bit receiver 152 is operable to receive pulses of light, such as frame 20, from other nodes 14 and transmit the information to switch unit 154. An example of bit receiver 152 is a photo diode.

Switch unit 154 is operable to generate a data scheme that occupies the requisite number of time slots 134 so that node 14 receiving frame 58 perceives frame 58 as lower rate frame 20. Switch unit 154 may generate frame 58 using its own data or data received via lower rate frame 20 transmitted from node 14. In other words, switch unit 154 fills the requisite number of time slots 134 with data so that the receiving node 14 perceives frame 58 as lower rate frame 20. Bit processor 158 is operable to process overhead information, such as error checking, error signaling, management communications, and time synchronization adjustment.

Signaling channel 160, which is a signaling unit, provides control signals between nodes 14/54 in network 50. Because nodes 14 are not upgraded yet, signaling channel 160 of upgraded node 54 operates during the upgrade process using a protocol aligned with the transmission rate of node 14, which, in this example, is 2.5 Gbps. In one embodiment, if signaling channel 160 is coupled to another upgraded node 54, signaling channel 160 may be directed to operate using a protocol aligned with an upgraded transmission rate. In one embodiment, signaling channel 160 may be directed to operate using a protocol aligned with the upgraded data transmission rate once all of the nodes 14 are upgraded to upgraded node 54. For example, the protocol carried by signaling channel 160 may be expanded to support all one hundred ninety two time slots 134 of frame 58 once all nodes 14 are upgraded to upgraded node 54.

Protocol unit 164 provides BLSR protocol to node 54 so that node 54 receives and transmits data according to BLSR protocol. Central control unit 168 is a microprocessor that controls bit transmission unit 150, switch unit 154, bit processor 158, signaling channel 160, and protocol unit 164. An example of control unit 168 is a PENTIUM processor, available from Intel Corporation In operation, lower rate frame 20 transmitted at 2.5 Gbps may be received at bit receiver 152. Signaling channel 160 provides coordination with node 14 that is to send lower rate frame 20 to node 54. Bit receiver 152 sends lower rate frame 20 to switch unit 154. using frame 20, switch unit 154 then generates frame 58 that includes time slots 134 that are not occupied by data. The number of occupied time slots 134 in frame 58 is equal to the number of occupied time slots 104 in lower rate frame 20. In one embodiment, all time slots 104 of lower rate frame 20 are fully occupied. Then switch unit 154 provides frame 58 to bit transmission unit 150 according to the protocol provided by protocol unit 164. Bit processor 158 processes overhead information associated with the communication with node 14, such as error checking, error signaling, management communications, and time synchronization adjustment. Bit transmission unit 150 then transmits frame 58 to node 14.

FIG. 5 is a flowchart illustrating a method 200 for providing communication service during an upgrade of a fiber optics network. Method 200 is described in conjunction with FIGS. 2 and 3. Method 200 starts at step 204. At step 208, at least one existing node 14 that is operable to generate data lower rate frame 20 is upgraded by providing upgraded node 54. At step 210, data frame 58 that is not fully occupied by data is generated at the upgraded node 54. The data may be generated at node 54 or received via lower rate frame 20. In case of the latter, node 54 is configured to receive lower rate frame 20 by setting signaling channel 160 to operate using a protocol that is aligned with the non-upgraded data transmission rate. Further, bit receiver 152 of node 54 is configured to receive data at the non-upgrade transmission rate of node 14, which is 2.5 Gbps in this example. In one embodiment, the number of occupied time slots 60 in frame 58 is the same as the number of occupied time slots 104 of lower rate frame 20.

At step 214, occupied time slot 60 of frame 58 are identified to the node 14 receiving frame 58. For example, time slots 134 of frame 58 may be labeled with numbers ranging from "0" to "191." Node 14 receiving frame 58 may be provided with information identifying one or more groups 60 of occupied time slots 134 using the numerical identifiers associated with time slots 134. Further, the node 14 that will receive frame 58 is configured to receive data at the upgraded transmission speed of node 54, which is 10 Gbps in this example. For example, the signaling channel of node 14 may be configured to carry a protocol that aligns with 10 Gbps and the bit receiver may be upgraded to receive data at 10 Gbps. At step 218, data frame 58 is transmitted from upgraded node 54 to non-upgraded node 14 over fiber 18. At step 220, frame 58 is received at the node 14. At step 224, using the identities of occupied time slots 134 of frame 58, node 14 detects data occupying occupied time slots 60. Method 200 stops at step 228.

By allowing continued communication between nodes having different data transmission rates, continued communication service may be provided while network 50 is undergoing an upgrade process. Further, some embodiments of the invention allow nodes operating at different rates to form a fiber optics network using BLSR.

Although some embodiments of the present invention have been described in detail, it should be understood that various changes, substitutions, and alterations can be made hereto without departing from the spirit and scope of the invention as defined by the appended claims.

What is claimed is:

1. A method for providing communications service during an upgrade of an optical communications ring formed from a plurality of nodes, each node operable to transmit and receive a first frame having a number of first time slots equal to N, wherein N is an integer and the first time slots are occupied by data, the method comprising:

upgrading a first node in the optical communications ring by increasing a data transmission rate of the first node to an increased rate, the first node coupled to a second node, the second node operable to transmit data at the data transmission rate;

at the increased rate, transmitting data in a second frame from the first node to the second node, the second frame having a number of second time slots equal to M, wherein M is an integer greater than N and the data occupies a number of the second time slots of the second frame equal to N;

providing at least one identifier to the second node, the at least one identifier identifying the occupied second time slots of the second frame;

receiving the second frame at the second node; and detecting, at the second node, the data in the identified second time slots of the second frame according to the at least one identifier.

2. The method of claim 1, and further comprising;
after the transmission of the second frame, upgrading all of the nodes by increasing the data transmission rate of each node to the rate that is higher than the data transmission rate;
occupying, using data, all of a number of third time slots of a third frame, wherein the number of third time slots equals M;
directing the second node to ignore the at least one identifier; and
transmitting the third frame.

3. The method of claim 1, wherein data comprises payload data and redundancy data, and wherein the payload data occupies a first group of the second time slots designated for payload data and the redundancy data occupies a second group of the second time slots designated for redundancy data.

4. The method of claim 1, wherein M equals one hundred ninety two and N equals forty eight.

5. The method of claim 4, wherein the data transmission rate is approximately 2.5 gigabits per second and the increased rate is approximately 10 gigabits per second.

6. The method of claim 1, and further comprising:
generating a third frame at the second node, the third frame having a number of occupied time slots equal to N occupied by the detected data and no unoccupied time slots; and
transmitting the third frame to one of the nodes.

7. The method of claim 1, and further comprising:
setting a first data receipt rate of the upgraded first node to equal the data transmission rate of a non-upgraded node;
setting a second data receipt rate of the second node to equal the increased rate of the first node;
receiving, at the upgraded first node, the first frame at the first data receipt rate; and
wherein receiving the second frame at the second node comprises receiving the second frame at the second data receipt rate.

8. The method of claim 1, further comprising transmitting data in the first frame from the second node to the first node at the data transmission rate.

9. A method for providing communications service in a communications ring formed from a plurality of existing nodes each operable to transmit, at an existing rate, a first frame having a number of occupied time slots equal to N occupied by data, wherein N is an integer, the method comprising:
increasing the existing rate of a node to a higher rate, the node operable to transmit a second frame at the higher rate, the second frame having a higher number of time slots than the first frame;
occupying a number of the time slots of the second frame equal to N using data to be received by at least one of the existing nodes;
providing at least one identifier to the at least one of the existing nodes, the identifier identifying the occupied time slots of the second frame; and
transmitting the second frame of data to the at least one of the existing nodes.

10. The method of claim 9, and further comprising:
receiving the second frame at the existing node; and
detecting, at the existing node, the data in the identified time slots of the second frame according to the at least one identifier.

11. The method of claim 9, wherein the second frame has a number of the time slots equal to M, wherein M is an integer, and further comprising;
after the transmission of the second frame, upgrading all of the existing nodes by increasing the existing rate to the higher rate;
directing the at least one existing node to ignore the at least one identifier; and
transmitting another frame having a number of the time slots equal to M from an upgraded one of the existing nodes.

12. The method of claim 9, wherein data comprises payload data and redundancy data, and wherein the payload data occupies a first group of the time slots designated for payload data and the redundancy data occupies a second group of the time slots designated for redundancy data.

13. The method of claim 9, wherein the higher number of the time slots is equal to exactly one hundred ninety two time slots and N equals forty eight.

14. The method of claim 13, wherein the existing rate is approximately 2.5 gigabits per second and the higher rate is approximately 10 gigabits per second.

15. The method of claim 9, and further comprising:
receiving the second frame at the existing node; and
detecting, at the existing node, the data in the identified time slots of the frame according to the at least one identifier;
generating another frame at the existing node, the another frame having fewer time slots than the second frame and a number of occupied time slots equal to N occupied by the detected data; and
transmitting the another frame to another one of the existing nodes at the existing rate.

16. The method of claim 9, wherein the data is divided into a plurality of categories, and the higher number of time slots are divided into a plurality of sections each corresponding to a particular one of the categories, and wherein each category of data occupies only a corresponding section of the time slots.

17. The method of claim 9, further comprising transmitting data in the first frame from a first existing node to a second existing node at the existing rate.

18. A node for forming an optical communications ring that includes a plurality of existing nodes each operable to transmit, at an existing rate, a first frame having a number of occupied time slots equal to N occupied by data, wherein N is an integer, the node comprising:
a bit transmission unit operable to transmit a second frame to an existing node of the optical communications ring at a rate that is higher than the existing rate, the second frame having a higher number of time slots than the first frame; and
a switch unit coupled to the bit transmission unit, the switch unit operable to generate a pattern of data that fills a number of the time slots of the second frame equal to N and to send the pattern of data to the bit transmission unit.

19. A node for forming an optical communications ring that includes a plurality of existing nodes each operable to transmit, at an existing rate, a first frame having a number of occupied time slots equal to N occupied by data, wherein N is an integer, the node comprising:
a bit transmission unit operable to transmit a second frame to an existing node of the optical communications ring at a rate that is higher than the existing rate, the second frame having a higher number of time slots than the first frame; and
a switch unit coupled to the bit transmission unit, the switch unit operable to generate a pattern of data that fills a number of the time slots of the second frame equal to N and to send the pattern of data to the bit transmission unit, wherein the existing node comprises at least one identifier identifying the occupied time slots of the second frame.

20. The node of claim 19, wherein the higher number of the time slots is equal to exactly one hundred ninety two time slots and N equals forty eight.

21. The node of claim 20, wherein the existing rate is approximately 2.5 gigabits per second and the rate is approximately 10 gigabits per second.

22. The node of claim 19, wherein the data is divided into a plurality of categories, and the time slots are divided into a plurality of sections each corresponding to a particular one of the categories, and wherein the switch unit is further operable to fill each section with only a corresponding one of the categories of data.

23. The node of claim 19, and further comprising a signaling unit coupled to the switch unit, the signaling unit operable to coordinate data frame transmission with the existing nodes using a protocol that aligns with the existing rate.

24. The node of claim 19, wherein the bit transmission unit is a laser gun that is operable to transmit a pattern of light pulses that represents the second frame.

25. A system for forming an optical communications ring, comprising:
   a first node operable to transmit and receive a first frame at an existing rate, the first frame having a number of occupied time slots equal to N occupied by data, wherein N is an integer;
   a second node coupled to the first node through optical fiber to form a bi-directional line switched ring, the second node comprising:
      a bit transmission unit operable to transmit a second frame to the first node at a rate that is higher than the existing rate, the second frame having a higher number of time slots than the first frame; and
      a switch unit coupled to the bit transmission unit, the switch unit operable to generate a pattern of data that fills a number of the time slots of the second frame equal to N and to send the pattern of data to the bit transmission unit;
   wherein the first node comprises at least one identifier identifying the occupied time slots of the second frame.

26. The system of claim 25, wherein the first node is operable to receive the second frame and detect the data in the identified time slots of the second frame according to the at least one identifier.

27. The system of claim 25, wherein data comprises payload data and redundancy data, and the time slots are categorized into a payload data group and a redundancy data group, and wherein the switch unit is further operable to fill the payload data group with only the payload data and to fill the redundancy data group with only the redundancy data.

28. The system of claim 25, wherein the higher number of the time slots is equal to exactly one hundred ninety two time slots and N equals forty eight.

29. The system of claim 28, wherein the existing rate is approximately 2.5 gigabits per second and the rate is approximately 10 gigabits per second.

30. The system of claim 25, wherein the data is divided into a plurality of categories, and the time slots are divided into a plurality of sections each corresponding to a particular one of the categories, and wherein the switch unit is further operable to fill each section with only a corresponding one of the categories of data.

31. The system of claim 25, wherein the second node further comprises a signaling unit coupled to the switch unit, the signaling unit operable to coordinate data frame transmission with the existing nodes using a protocol that aligns with the existing rate.

32. The system of claim 25, wherein the bit transmission unit is a laser gun that is operable to transmit a pattern of light pulses that represents the pattern of data.

33. The node of claim 19, wherein data comprises payload data and redundancy data, and the time slots are categorized into a payload data group and a redundancy data group, and wherein the switch unit is further operable to fill the payload data group with only the payload data and to fill the redundancy data group with only the redundancy data.

* * * * *